US006795533B2

(12) United States Patent
Erb et al.

(10) Patent No.: US 6,795,533 B2
(45) Date of Patent: Sep. 21, 2004

(54) INTERMEDIATE VOICE AND DTMF DETECTOR DEVICE FOR IMPROVED SPEECH RECOGNITION UTILIZATION AND PENETRATION

(75) Inventors: Paul Andrew Erb, Ottawa (CA); Dieter Schulz, Kanata (CA)

(73) Assignee: Mitel Knowledge Corporation, Ontario (CA)

(*) Notice: Subject to any disclaimer, the term of this patent is extended or adjusted under 35 U.S.C. 154(b) by 0 days.

(21) Appl. No.: 10/224,063

(22) Filed: Aug. 20, 2002

(65) Prior Publication Data

US 2003/0039338 A1 Feb. 27, 2003

(51) Int. Cl.[7] ............................................... H04M 1/64
(52) U.S. Cl. .................................... 379/88.01; 704/275
(58) Field of Search ........................... 379/88.01, 88.03, 379/88.04, 88.02; 704/233, 275, 270, 270.1; 455/563, 557, 412, 523, 412.1, 412.2

(56) References Cited

U.S. PATENT DOCUMENTS

| | | | |
|---|---|---|---|
| 4,742,534 A | * 5/1988 | Verbeek et al. | ............. 375/335 |
| 5,459,781 A | 10/1995 | Kaplan et al. | |
| 6,160,877 A | 12/2000 | Tatchell et al. | |
| 6,292,675 B1 | * 9/2001 | Nilsson | ....................... 455/563 |
| 6,405,033 B1 | * 6/2002 | Kennedy et al. | ......... 455/414.1 |

FOREIGN PATENT DOCUMENTS

| | | |
|---|---|---|
| GB | 2 323 114 A | 2/1999 |
| JP | 6-303320 | 10/1994 |
| WO | WO 00/49790 | 8/2000 |

OTHER PUBLICATIONS

WO 00/49790, A. Kurganov, Speech-recognition-based phone numbering plan, Aug. 24, 2000.*
Search Report EP 02 25 5290, Feb. 4, 2003, Hague.

* cited by examiner

Primary Examiner—Fan Tsang
Assistant Examiner—Ming Chow
(74) Attorney, Agent, or Firm—Fulwider Patton Lee & Utecht, LLP

(57) ABSTRACT

A telephone system is provided comprising a plurality of telephone devices, a call control for establishing calls between the telephone devices in response to receipt of commands, at least one Voice and DTMF detector (VDD) resource allocated to the calls between the telephone devices for (i) detecting and transmitting DTMF tones received from the telephone devices to the call control for further call processing, and for (ii) detecting and buffering voice received from the telephone devices and notifying the call control. At least one Speech Recognition Engine is also provided for receiving the voice from the Voice and DTMF detector resource upon notification of the call control and in response performing speech recognition and notifying the call control for further call processing.

4 Claims, 2 Drawing Sheets

Figure 1:
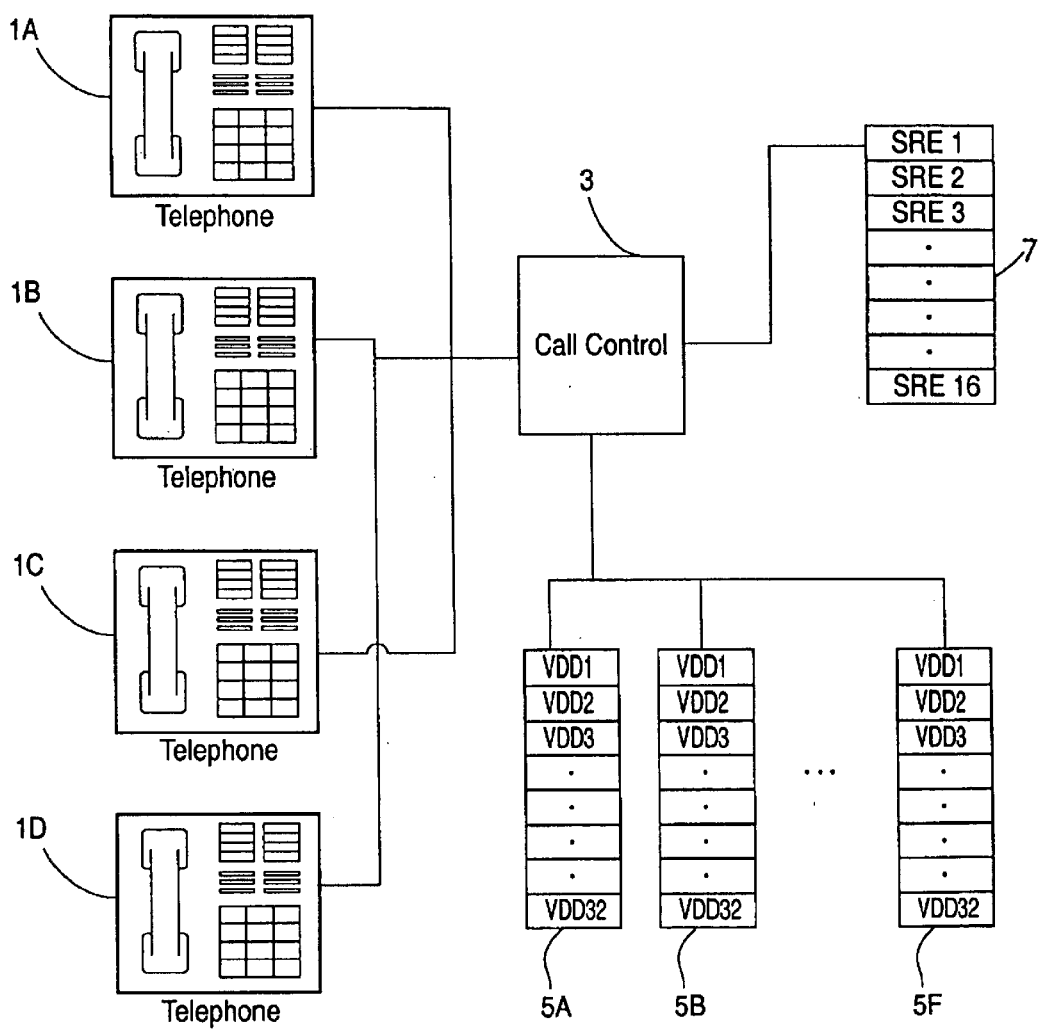

INTERMEDIATE VOICE AND DTMF DETECTOR DEVICE FOR IMPROVED SPEECH RECOGNITION UTILIZATION AND PENETRATION

This application claims priority of UK application No. 0120672.1 filed Aug. 24, 2001. That application is incorporated herein by reference.

FIELD OF THE INVENTION

The present invention relates in general to voice recognition systems for telephony, and more specifically to a method and apparatus for providing voice and tone detection prior to allocation of a speech recognition engine to a call.

BACKGROUND OF THE INVENTION

The integration of speech recognition into modern day PBX systems provides new user interface capabilities to augment traditional telephone device DTMF tones and 'feature' keys for call control. Speech recognition capabilities may be provided through the allocation of speech recognition engines (SREs) to a call in progress. For example, PBX systems manufactured by Mitel Networks Corporation may be configured with a number of ports for allocating Speak@Ease™ SRE resources. Each SRE resource is a general purpose "device" which provides all speech recognition and related capabilities (which may be composed of one or more processes). These capabilities include, but are not limited to, voice detection, DTMF detection, voice recognition, and application processing.

As speech recognition becomes more common, it is anticipated that a much larger number of SRE resources will be required to accommodate increased utilization. The provisioning of additional SRE resources to meet anticipated usage increases the overall cost of a PBX installation. As a result, the potential penetration of speech recognition applications is subject to cost considerations and is limited except where cost justified.

According to the existing state-of-the-art, SRE resources are associated with a call whenever there is a potential need for speech recognition, regardless of whether speech recognition is actually invoked during the call. Consequently, PBX systems are now configured with a plurality of SRE resources that are dedicated to servicing one or more speech recognition applications, in a PBX network. When all of the SRE resources are in use, subsequent requests for the supported speech recognition applications are denied or deferred until an SRE resource becomes available. When the SRE is servicing a user, all capabilities are provided, regardless of utilization. For example, if a user initiates a request for which an SRE is allocated and simply dials digits at the telephone device (i.e. dialing the destination number rather than speaking the name) then the full capabilities of the SRE are underutilized. However, as indicated above call control allocates the SRE resource whenever speech recognition may be required, regardless of actual utilization.

SUMMARY OF THE INVENTION

According to the present invention, a voice and DTMF detector resource (VDD) is allocated to a call prior to allocating an SRE resource. The SRE resource is only allocated when speech recognition capabilities are required. The Voice and DTMF detector resource (VDD) is a limited capability digital signal processor that can be provided in volume at relatively low cost (using existing Digital Signal Processing (DSP) technology). The presence or absence of the Voice and DTMF detector resource (VDD) does not impact the SRE resource.

BRIEF DESCRIPTION OF THE DETAILED DRAWINGS

Figure 2:
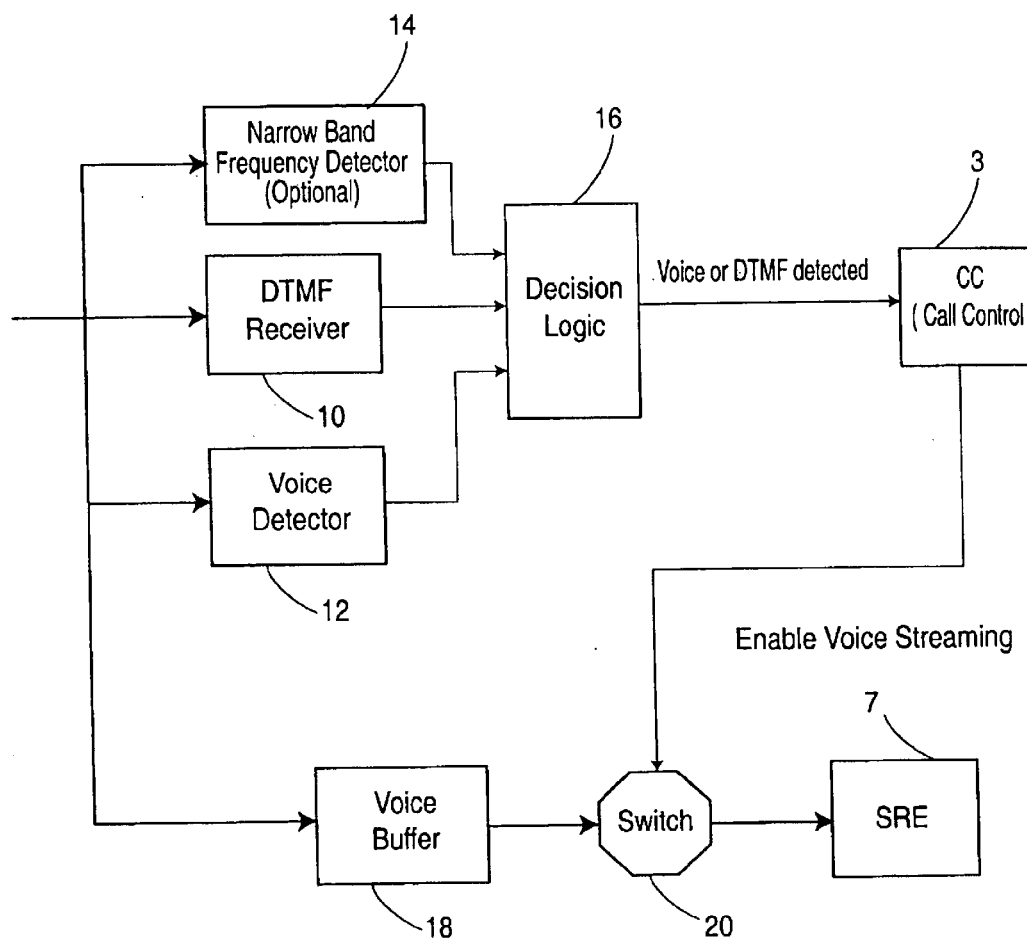

A description of a preferred embodiment of the present invention is provided herein below with reference to the accompanying drawings in which:

FIG. 1 is a block diagram of a telephony system incorporating a plurality of intermediate Voice and DTMF detector resources (VDDs) and Speech Recognition Engines (SREs), according to the present invention; and FIG. 2 shows the structure and operation of a VDD in accordance with the preferred embodiment.

DETAILED DESCRIPTION OF PREFERRED EMBODIMENTS

Turning to FIG. 1, a telephony system is shown incorporating the principles of the present invention. Specifically, a plurality of telephones 1A, 1B, etc. are provided for conducting telephone calls between parties under control of call control 3. In accordance with the present invention, a plurality of Voice and DTMF detector resources (VDDs) 5A, 5B . . . 5F may be allocated to an originating call by call control 3 in a manner similar to a traditional DTMF receiver. Each VDD 5A, 5B, etc. is a special purpose digital signal processing (DSP) resource which provides DTMF detection, voice detection, voice buffering and voice streaming, as discussed in greater detail below. A plurality of SRE resources 7 is also provided, as is known in the art.

In operation, call control 3 allocates a VDD (e.g. VDD 5A) in response to one of the telephones (e.g. phone 1A) initially going off-hook. The SRE resources 7 are not immediately allocated to the call, in contrast with prior art systems. Upon detection of DTMF tone, the VDD 5A performs digit collection and reporting as is done by a traditional DTMF receiver. Upon detection of voice, however, the VDD 5A provides an indication to call control 3. Call control 3 then allocates an SRE resource 7, establishes a connection between the VDD 5A and the SRE resource 7, and requests the VDD 5A to begin streaming buffered voice to the connected SRE resource 7 (while buffering the received voice). The SRE resource 7 receives voice from the VDD 5A as though connected directly to a telephone device and performs the usual speech recognition operations.

If an SRE resource 7 is unavailable, a warning is provided to the user by call control 3. The user is prompted to be patient until an SRE resource 7 becomes available or, alternatively, to try their request later (i.e. deferring or rejecting the request, respectively). However, in the event that the VDD 5A contains sufficient memory to buffer up to ten seconds of voice, (e.g. by applying real-time voice compression algorithms), call control 3 is configured to perform a second attempt to obtain an SRE resource 7 prior to deferring or rejecting the user request.

The VDD resource 5A purges its voice buffer upon receipt of an instruction from call control 3.

Turning to FIG. 2, the VDD consists of a DTMF receiver 10, a voice detector 12, and optionally a narrow band frequency detector 14 to guard against spurious triggers when tones are present. The output of the detectors is fed to a decision logic block 16 that determines whether a voice phrase or a DTMF tone is present. In parallel with the foregoing blocks, the voice is buffered in a voice buffer 18, to compensate for latencies in the detection process and delays in switching in the SRE resource.

The voice buffer 18 is continuously updated such that the newest sample overwrites the oldest. This can be implemented either by a circular buffer or a shift register buffer, both of which are commonly known in the art. The length of the buffer depends on the inherent latencies of the detectors, the delays in the system and the typical time the user wishes to allow for the system to respond.

Upon detection of a DTMF digit, the digit is reported to call control 3. When voice is detected, the delayed voice stream is switched at 20 to an SRE 7 for speech recognition.

Additional speech recognition functions can be performed by the VDDs 5A, 5B, etc., such as voice end-pointing and hot word spotting, in order to further off-load the requirements of the SRE's 7.

Exemplary pseudo-code for implementation of the DTMF detector 10, is as follows:

```
DO Forever
   Receive Signal
   IF DTMF detected
      Send DTMF detected event to decision logic
   END
ENDDO
```

Exemplary pseudo-code for implementation of the voice detector 12, is as follows:

```
DO Forever
   Receive Signal
   IF Voice detected
      Send Voice detected event to decision logic
   END
ENDDO
```

Exemplary pseudo-code for implementation of the optional narrow-band frequency detector, is as follows:

```
DO Forever
   Receive Signal
   IF Narrow Band Freq detected
      Send Narrow Band Freq detected event to decision
         logic
   END
ENDDO
```

Exemplary pseudo-code for implementation of the decision logic 16, is as follows:

```
DO Forever
   IF DTMF detected
      Send DTMF detected event to client
   ELSE IF Narrow bandfreq detected (optional)
      Do nothing
   ELSE IF Voice detected
      Send Voice detected event to client
   END
ENDDO
```

A person of ordinary skill in the art will appreciate that by utilizing the VDD resources of the present invention, substantial savings may be obtained in the cost of deploying SRE resources. For example, in a networked telephone system having 1000 users and allowing for 20% of the users to actively initiate call re-direction, 192 VDD resources may be provided (6 banks×32 VDDs per bank) for initial call allocation. Allowing for 10% of these calls to require actual speech recognition services, then 16 SRE resources are needed. The cost of 192 VDDs and 16 SREs is significantly less than the cost of 192 SRE resources.

It will be appreciated that, although embodiments of the invention have been described and illustrated in detail, various changes and modifications may be made. For example, although the preferred embodiment utilizes a Mitel Speech Recognition Engine (sold under the name SpeakEasy or Speak@Ease), other SRE resources may be used. Furthermore, the telephones 1A, 1B, etc. may be any suitable voice communication device such as a Plain Old Telephone Set (POTS), mobile phone, IP Phone, PC with voice communication functionality, etc. Also, the principles of the invention may be applied to other applications than speech recognition enhanced telephone directory services. For example, the invention may be used to advantage in a Call Center and/or Interactive Voice Response (IVR) application where a user may be prompted for information and DTMF or speech recognition is used to obtain caller responses. The invention as described above has been applied specifically to voice applications in the PBX domain. However, the invention may also be applied equally to voice applications in the CO domain and in mixed media communications, in either domain. Specifically, the invention may be applied to any situation where a large number of general purpose SRE resources can be displaced by a similar number of low cost VDD resources and a smaller number of SRE resources.

All of the forgoing changes and modifications may be made without departing from the sphere and scope of the invention as defined by the claims appended herein.

What is claimed is:

1. A telephone system comprising:
   a plurality of telephone devices;
   a call control for establishing calls between said telephone devices in response to receipt of commands from said telephone devices;
   at least one Voice and DTMF detector resource automatically allocated to said calls between said telephone devices for (i) detecting and transmitting DTMF tones received from said telephone devices to said call control for further call processing, and (ii) for detecting and buffering voice received from said telephone devices and notifying said call control; and
   at least one Speech Recognition Engine for receiving said voice from said at least one Voice and DTMF detector resource only upon notification of said call control and in response performing speech recognition and notifying said call control for further call processing.

2. The telephone system of claim 1, wherein said at least one Voice and DTMF detector resource further comprises:
   a DTMF detector for detecting DTMF tones received from said telephone devices;
   a voice detector for detecting voice received from said telephone devices;
   a voice buffer voice received from said telephone devices; and
   decision logic connected to said DTMF detector and said voice detector for detecting between voice and DTMF tones received from said telephone devices and in response notifying said call control, whereupon said voice buffered within said voice buffer is transmitted to said at least one Speech Recognition Engine.

3. The telephone system of claim 2, wherein said voice buffer is one of either a circular buffer or shift register buffer for continuously updating samples of said voice such that each new sample over-writes an oldest buffered sample.

4. The telephone system of claim 2, wherein said at least one Voice and DTMF detector resource further comprises a narrow band frequency detector for preventing spurious switching of said voice to said at least one Speech Recognition Engine.

* * * * *